(12) United States Patent
Liu et al.

(10) Patent No.: US 9,383,745 B2
(45) Date of Patent: Jul. 5, 2016

(54) METHOD AND DEVICE FOR CONTROLLING FURNACE TEMPERATURE OF BURNING HEATING FURNACE

(75) Inventors: Yongfeng Liu, Shanghai (CN); Guoqiang Qian, Shanghai (CN); Huazhong Gu, Shanghai (CN); Rong Chen, Shanghai (CN); Zhicheng Wang, Shanghai (CN); Chunguo Lv, Shanghai (CN); Dejian Wen, Shanghai (CN); Peili Zhang, Shanghai (CN)

(73) Assignee: Baoshan Iron & Steel Co., Ltd., Shanghai (CN)

( * ) Notice: Subject to any disclaimer, the term of this patent is extended or adjusted under 35 U.S.C. 154(b) by 693 days.

(21) Appl. No.: 13/881,682
(22) PCT Filed: Apr. 27, 2011
(86) PCT No.: PCT/CN2011/073363
§ 371 (c)(1),
(2), (4) Date: Jun. 24, 2013
(87) PCT Pub. No.: WO2012/055222
PCT Pub. Date: May 3, 2012

(65) Prior Publication Data
US 2014/0364994 A1  Dec. 11, 2014

(30) Foreign Application Priority Data
Oct. 27, 2010 (CN) .......................... 2010 1 0521573

(51) Int. Cl.
*G05B 23/02* (2006.01)
*G05B 13/02* (2006.01)
(Continued)

(52) U.S. Cl.
CPC ............ *G05B 23/0235* (2013.01); *C21D 11/00* (2013.01); *F23N 1/022* (2013.01);
(Continued)

(58) Field of Classification Search
CPC ............... G05B 11/42; G05B 13/0265; G05B 23/0235; G05D 23/1904
See application file for complete search history.

(56) References Cited

U.S. PATENT DOCUMENTS 5,311,421 A * 5/1994 Nomura ............. G05B 13/0285
700/37

(Continued)

FOREIGN PATENT DOCUMENTS

CN 1510360 A 7/2004
CN 1690892 A 11/2005
(Continued)

OTHER PUBLICATIONS

International Search Report mailed on Jul. 28, 2011, for PCT Patent Application No. PCT/CN2011/073363, filed on Apr. 27, 2011, 4 pages.

*Primary Examiner* — Crystal J Barnes-Bullock
(74) *Attorney, Agent, or Firm* — Kilpatrick Townsend & Stockton LLP

(57) ABSTRACT

A method for controlling furnace temperature of a fired heating furnace is disclosed, comprising: measuring furnace temperatures to obtain furnace temperature feedback values; calculating the differences between furnace temperature setting values and the furnace temperature feedback values as discrepancy values $DV_1$, in accordance with the furnace temperature feedback values and the furnace temperature setting value; calculating the differences between the furnace temperature setting values and the furnace temperature feedback values in a unit time, i.e., the gradient of furnace temperature change values, as discrepancy values $DV_2$; obtaining a speed V of a fired heater machine set from a speed adjuster of the fired heater machine set, and obtaining a first multiple feed forward output components $FF_V$ in accordance with the speed V of the machine set (V); obtaining a second multiple feed forward output components $FF_T$ in accordance with the differences between the furnace temperature setting values and the furnace temperature feedback values, i.e., the discrepancy values $DV_1$; looking up a PID control parameter in accordance with the discrepancy values $DV_1$ and $DV_2$, based on fuzzy control rule, and creating an adjusting control parameter $OP_1$ in accordance with the PID control parameter; controlling a valve for regulating coal gas flow and a valve for regulating air flow by combining the adjusting control parameter $OP_1$ with the first multiple feed forward components $FF_V$ and the second multiple feed forward components $FF_T$ as a final control output value.

10 Claims, 3 Drawing Sheets

(51) Int. Cl.
- *G05B 11/42* (2006.01)
- *C21D 11/00* (2006.01)
- *F23N 1/02* (2006.01)
- *F27D 19/00* (2006.01)
- *F27D 21/00* (2006.01)
- *G05D 23/19* (2006.01)
- *C21D 1/34* (2006.01)
- *F23N 5/18* (2006.01)

(52) U.S. Cl.
CPC ............... *F27D 19/00* (2013.01); *F27D 21/00* (2013.01); *F27D 21/0014* (2013.01); *G05B 11/42* (2013.01); *G05B 13/0265* (2013.01); *G05D 23/19* (2013.01); *G05D 23/1919* (2013.01); *C21D 1/34* (2013.01); *F23N 2005/181* (2013.01); *F23N 2005/185* (2013.01); *F23N 2023/14* (2013.01); *F23N 2023/34* (2013.01); *F23N 2023/36* (2013.01); *F23N 2023/52* (2013.01); *F23N 2025/14* (2013.01); *F23N 2025/16* (2013.01); *F27D 2019/0003* (2013.01)

(56) References Cited

U.S. PATENT DOCUMENTS

| | | | |
|---|---|---|---|
| 6,411,944 B1 * | 6/2002 | Ulyanov | G05B 13/0265 700/13 |
| 6,882,992 B1 * | 4/2005 | Werbos | G06N 3/105 706/16 |
| 9,063,551 B2 * | 6/2015 | Deivasigamani | G05D 7/0629 |
| 9,122,260 B2 * | 9/2015 | Lou | G05B 13/04 |

FOREIGN PATENT DOCUMENTS

| | | |
|---|---|---|
| CN | 101464096 A | 6/2009 |
| CN | 101693945 A | 4/2010 |
| JP | 9-316545 A | 12/1997 |
| JP | 11-83005 A | 3/1999 |

\* cited by examiner

US 9,383,745 B2

METHOD AND DEVICE FOR CONTROLLING FURNACE TEMPERATURE OF BURNING HEATING FURNACE

This application is a national stage application under 35 USC 371 of International Application No. PCT/CN2011/073363, filed Apr. 27, 2011, which claims the priority of Chinese Patent Application No. 201010521573.0, filed Oct. 27, 2010, the contents of which prior applications are incorporated herein by reference.

TECHNICAL FIELD

The present invention relates to the field of smelting apparatus, especially to a method for controlling furnace temperature of a fired heating furnace and a controlling device.

BACKGROUND ART

Horizontal furnace for continuous annealing is a relatively common heating furnace, which is divided into several zones in a travel direction of strips in the furnace, so as to control furnace temperature in sub-zones. The accuracy of the measurement of furnace temperature affects the quality and performance of products, so the precision of furnace temperature is extremely important to the performance of the product, the reduction in the precision of furnace temperature directly causes the disqualification in the performance of the product. Because the power of the burner is designed to be relatively high in normal temperature controlling system, which induces relatively high thermal lag and thermal inertia in temperature adjustment, thereby making the curve of the furnace temperature oscillate with a constant amplitude when in stable state, and making the transit time long when in unstable state. These will severely affect the performance and the yield of the product. A conventional method for controlling furnace temperature is dual crossing PID control, which controls the furnace temperature by the proportion between coal gas and air as well as the diversion between the respective proportions. This controlling method is good to systems in which the thermal lag is relatively low. However, the thermal lag and thermal inertia in an annealing furnace is normally relatively high, so that the difficulty in furnace temperature control is relatively high. Also, as to PID controlling method, there is a requirement for pursuing quick response, and another requirement for pursuing stability. If the quick response is desired, the transit time may be shortened, but overshooting will be larger, thereby making the furnace temperature hard to be stabilized. If the stability is desired, the precision of furnace temperature is better, but the transit time of furnace temperature is certainly very long. Thus, it will put control into a dilemma. Furthermore, PID control is after all a stable adjusting method, it can not estimate the incoming material and the change in temperature setting values in advance, and it does not have many adjusting means to the lag in unstable state, the adjustment effect is not good as well. It is necessary to carry out a feed forward control so as to compensate for the lag control in unstable state.

DISCLOSURE OF THE INVENTION

The object of the present invention is to overcome these problems existing in furnace temperature control described above, and provides a method for controlling furnace temperature of a fired heating furnace and a control device.

According to one aspect of the present invention, a method for controlling furnace temperature of a fired heating furnace, comprising:

measuring furnace temperatures to obtain furnace temperature feedback values;

calculating the differences between furnace temperature setting values and the furnace temperature feedback values, as discrepancy values $DV_1$, in accordance with the furnace temperature feedback values and the furnace temperature setting values;

calculating the differences between the furnace temperature setting values and the furnace temperature feedback values in a unit time, i.e., the gradient of furnace temperature change values, as discrepancy values $DV_2$;

obtaining a speed V of a fired heater machine set from a speed adjuster of the fired heater machine set, and obtaining a first multiple feed forward output components $FF_V$ in accordance with the speed V of the fired heater machine set;

obtaining a second multiple feed forward output components $FF_T$ in accordance with the differences between the furnace temperature setting values and the furnace temperature feedback values, i.e., the discrepancy values $DV_1$;

looking up a PID control parameter in accordance with the discrepancy values $DV_1$ and $DV_2$, based on a fuzzy control rule, and creating an adjusting control parameter $OP_1$ in accordance with the PID control parameter;

controlling a valve for regulating coal gas flow and a valve for regulating air flow by combining the adjusting control parameter $OP_1$ with the first multiple feed forward components $FF_V$ and the second multiple feed forward components $FF_T$ as a final control output value.

According to another aspect of the present invention, a device for controlling furnace temperature of a fired heating furnace, comprising:

a thermocouple disposed adjacent to a burner, and is used for monitoring furnace temperatures, the thermocouple having an analog-to-digital converting module to output furnace temperature feedback values;

a module for calculating a furnace temperature difference which is connected to the analog-to-digital converting module of the thermocouple, the module for calculating the furnace temperature difference saving furnace temperature setting values, and the module for calculating the furnace temperature difference calculating the differences between furnace temperature setting values and furnace temperature feedback values and set these differences as discrepancy values $DV_1$;

a module for calculating a gradient of furnace temperature change which is connected to the module for calculating the furnace temperature difference, it calculating and setting the differences between the furnace temperature setting values and the furnace temperature feedback values in a unit time, i.e., the gradients of furnace temperature change values, as discrepancy values $DV_2$;

a speed adjuster of a fired heater machine set being used for obtaining a speed V of the fired heater machine set;

a first multiple feed forward module, connected to the speed adjuster, obtaining a first multiple feed forward output components $FF_V$ in accordance with the speed of the fired heater machine set;

a second multiple feed forward module, connected to the module for calculating the furnace temperature difference, obtaining a second multiple feed forward output components $FF_T$ in accordance with the differences between the furnace temperature setting values and the furnace temperature feedback values, i.e., the discrepancy values $DV_1$;

a module for creating an adjusting control parameter, which is connected to the module for calculating the furnace temperature difference and the module for calculating the gradient of furnace temperature change, looking up a PID control parameter in accordance with the discrepancy values $DV_1$ and $DV_2$, based on the fuzzy control rule, and creating an adjusting control parameter $OP_1$ in accordance with the PID control parameter;

a flow controller, connected to the module for creating an adjusting control parameter, the first multiple feed forward module and the second multiple feed forward module, creating a final control output value by combining the adjusting control parameter $OP_1$ with the first multiple feed forward components $FF_V$ and the second multiple feed forward components $FF_T$;

a valve for regulating coal gas flow, connected to the flow controller, regulating the coal gas flow in accordance with the final control output value;

a coal gas flow detector, connected to the flow controller, detecting the current coal gas flow and feed it back;

a valve for regulating air flow, connected to the flow controller, regulating the air flow in accordance with the final control output value; and an air flow detector, connected to the flow controller, detecting the current air flow and feed it back.

The control method and control device of the present invention utilize a fuzzy control algorithm without building a transfer function of forward path, thereby having advantages that it has a certain adaptive capacity and a good rapidity for the system not having a very definite nonlinearity, time change and regularity. Thus, it is better for steady-state control of machine set. The multiple feed forward control is good to prejudge the incoming material situation and temperature setting values in advance. Therefore, the present invention designs a fuzzy control algorithm in accordance with the characteristic of the furnace temperature control of continuous annealing furnace. By utilizing the characteristic that fuzzy control is good at steady-state control and that the multiple feed forward control is good at unsteady-state control, as well as combining the fuzzy control with the multiple forward control and PID control, a multiple feed forward fuzzy control system is built.

The basic concept of the method for controlling furnace temperature of a fired heating furnace and the control device in accordance with the present invention is that: it can get the value of discrepancy of furnace temperature and the trend of furnace temperature's change in accordance with the furnace temperature change values and furnace temperature change rates. By designing the fuzzy control algorithm and fuzzy control rule, with the characteristics that the fuzzy control is good at steady-state control and feed forward control is good at unsteady-state control, different multiple feed forward compensating values and fuzzy control rules as well as different combinations of PID parameters will be used under different circumstances. Thus, it responds quickly, adjusts rapidly and shortens the transition time in large discrepancy, and slows down the adjusting trend, decreases the overshooting and makes the furnace temperature stable quickly in small discrepancy, so that the precision of furnace temperature will be improved.

DETAILED DESCRIPTION OF THE PREFERRED EMBODIMENT OF THE INVENTION

Figure 1:
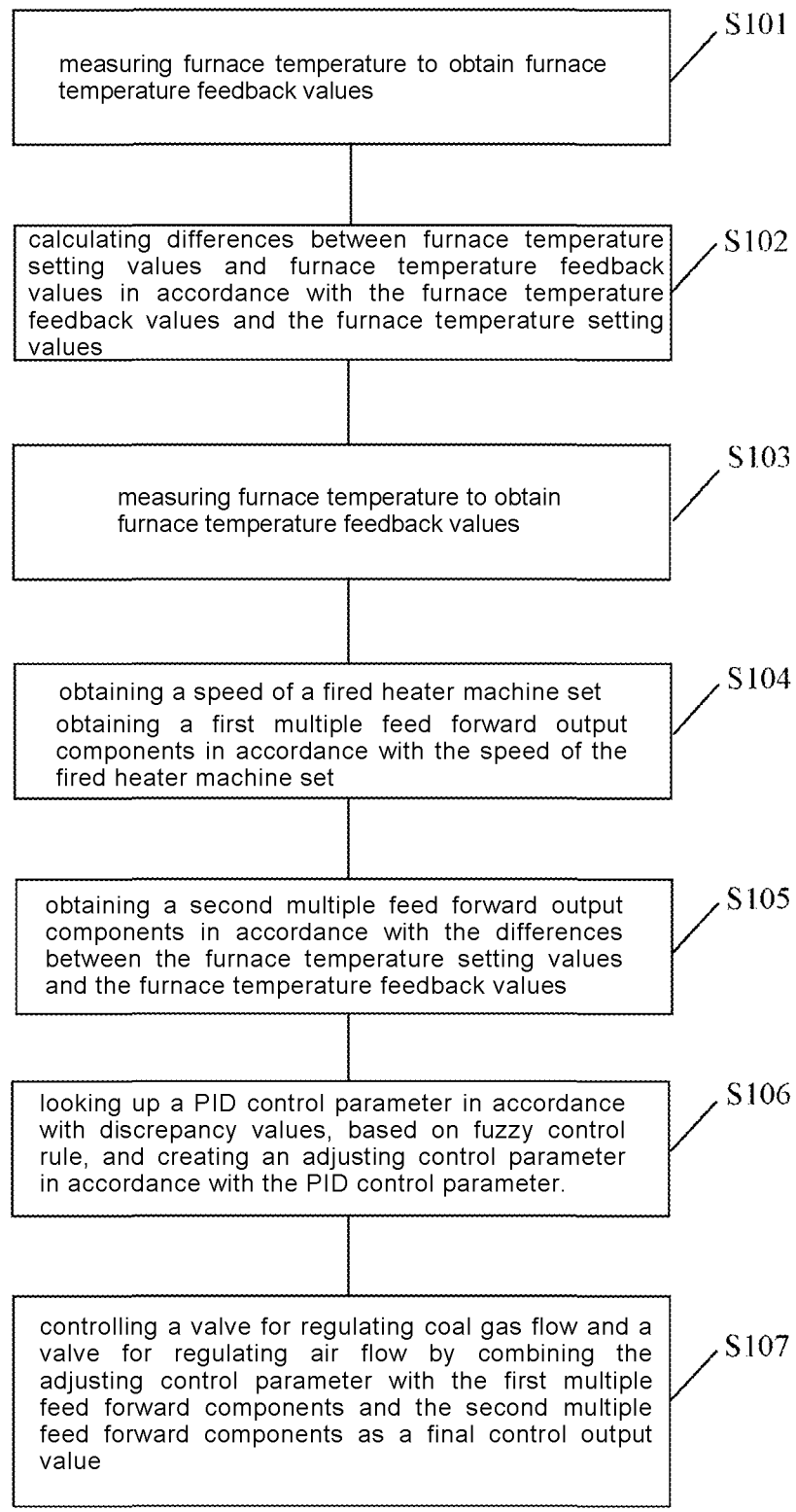
FIG. 1 is a flow chart illustrating a method for controlling furnace temperature of a fired heating furnace in accordance with the present invention.

With reference to FIG. 1, a method for controlling furnace temperature of a fired heating furnace is disclosed by the present invention, comprising steps as follows.

S101. It measures furnace temperatures to obtain furnace temperature feedback values.

S102. It calculates the differences between furnace temperature setting values and the furnace temperature feedback values, as discrepancy values $DV_1$, in accordance with the furnace temperature feedback values and the furnace temperature setting values. In one embodiment, the discrepancy values $DV_1$ between the furnace temperature setting values and the furnace temperature feedback values are set into a fuzzy control subset, the fuzzy control subset E={NB, NM, NS, ZE, PS, PM, PB}={Negative (Big), Negative (Medium), Negative (Small), Zero, Positive (Small), Positive (Medium), Positive (Big)}={−18, −12, −6, 0, 6, 12, 18}. That is, in accordance with the comparison between the discrepancy values $DV_1$ and subset {−18, −12, −6, 0, 6, 12, 18}, the discrepancy values $DV_1$ are classified into the subset {Negative (Big), Negative (Medium), Negative (Small), Zero, Positive (Small), Positive (Medium), Positive (Big)}, and represented by {NB, NM, NS, ZE, PS, PM, PB}.

S103. It calculates the differences between the furnace temperature setting values and the furnace temperature feedback values in a unit time, i.e., the gradients of furnace temperature change values, as discrepancy values $DV_2$. In one embodiment, the gradients of the furnace temperature change value, which are the discrepancy values $DV_2$, are set into a fuzzy control subset, the fuzzy control subset EC={NM, NS, ZE, PS, PM}={Negative (Medium), Negative (Small), Zero, Positive (Small), Positive (Medium)}={−1.5, −1, 0, 1, 1.5}. That is, in accordance with the comparison between the discrepancy values $DV_2$ and subset {−1.5, −1, 0, 1, 1.5}, the discrepancy values $DV_2$ are classified into the subset {Negative (Medium), Negative (Small), Zero, Positive (Small), Positive (Medium)}, and represented by {NM, NS, ZE, PS, PM}.

S104. It obtains a speed V of a fired heater machine set from a speed adjuster of the fired heater machine set, and obtains a first multiple feed forward output components $FF_V$ in accordance with the speed V of the fired heater machine set. In one embodiment, this step S104 is carried out as follows: the first multiple feed forward output components $FF_V$ can be obtained in accordance with the speed of fired heater machine set V, based on the following Table 1.

TABLE 1

| | V | | | | | | |
|---|---|---|---|---|---|---|---|
| | 100 | 110 | 120 | 130 | 140 | 150 | 160 |
| $FF_V$ | $FF_{V1}$ | $FF_{V2}$ | $FF_{V3}$ | $FF_{V4}$ | $FF_{V5}$ | $FF_{V6}$ | $FF_{V7}$ |

That is, the different scope of the speeds V of fired heater machine set corresponds to different first multiple feed back output components $FF_V$. $FF_{V1}$ to $FF_{V7}$ are a set of setting parameters. In one embodiment, values of $FF_V$ are set as: $FF_{V1}=2$, $FF_{V2}=3.5$, $FF_{V3}=5$, $FF_{V4}=6.5$, $FF_{V5}=8$, $FF_{V6}=10$, $FF_{V7}=12$.

S105. It obtains a second multiple feed forward output components in accordance with the differences between the furnace temperature setting values and the furnace temperature feedback values, i.e., discrepancy values $DV_1$. In one embodiment, this step S105 is carried out as follows: the second multiple feed forward output components $FF_V$ can be obtained in accordance with the differences $DV_1$ between the furnace temperature setting values and the furnace temperature feedback values, based on the following Table 2.

TABLE 2

| | | | $DV_1$ | | | |
|---|---|---|---|---|---|---|
| −18 | −12 | −6 | 0 | 6 | 12 | 18 |
| $FF_T$ $FF_{T1}$ | $FF_{T2}$ | $FF_{T3}$ | $FF_{T4}$ | $FF_{T5}$ | $FF_{T6}$ | $FF_{T7}$ |

That is, the different scope of the differences $DV_1$ between the furnace temperature setting values and the furnace temperature feedback values correspond to different second multiple feed back output components $FF_T$. $FF_{T1}$ to $FF_{T7}$ are a set of setting parameters. In one embodiment, values of $FF_T$ are set as: $FF_{T1}=6$, $FF_{T2}=3$, $FF_{T3}=1.5$, $FF_{T4}=0.2$, $FF_{T5}=-1.6$, $FF_{T6}=-3.5$, $FF_{T7}=-6$.

S106. It looks up a PID control parameter in accordance with the discrepancy values $DV_1$ and $DV_2$, based on a fuzzy control rule, and creates an adjusting control parameter $OP_1$ in accordance with the PID control parameter. In one embodiment, the fuzzy control rule is as follows.

The results of the fuzzy rule are obtained in accordance with the subsets of $DV_1$ and $DV_2$, based on the following Table 3.

TABLE 3

| | | | | E | | | |
|---|---|---|---|---|---|---|---|
| | | NB | NM | NS | ZE | PS | PM | PB |
| EC | NM | PB | PB | PM | PM | PS | PS | PS |
| | NS | PB | PM | PM | PS | PS | PS | PS |
| | ZE | PM | PM | PS | PS | PS | PS | PS |
| | PS | PS | PS | PS | NS | NM | NM | NM |
| | PM | PM | PS | NS | NM | NB | NB | NB |

The results of the fuzzy rule comprise NB, NM, NS, ZE, PS, PM, PB, and basic values of PID parameters are obtained in accordance with the results of fuzzy rule, based on the following Table 4.

TABLE 4

| | | | Results of Fuzzy Rule | | | |
|---|---|---|---|---|---|---|
| | NB | NM | NS | ZE | PS | PM | PB |
| P | P1 | P2 | P3 | P4 | P5 | P6 | P7 |
| I | I1 | I2 | I3 | I4 | I5 | I6 | I7 |
| D | D1 | D2 | D3 | D4 | D5 | D6 | D7 |

Each result of the fuzzy rule corresponds to a set of values of parameters P, I and D, i.e., basic values of parameters, wherein P1 to P7, I1 to I7 and D1 to D7 are all predetermined basic values of parameters. In one embodiment, the basic values of PID parameters are set as follows.

| P | P1 = 40 | P2 = 50 | P3 = 55 | P4 = 60 | P5 = 55 | P6 = 45 | P7 = 40 |
|---|---|---|---|---|---|---|---|
| I | I1 = 50 | I2 = 55 | I3 = 60 | I4 = 90 | I5 = 65 | I6 = 50 | I7 = 45 |
| D | D1 = 30 | D2 = 40 | D3 = 40 | D4 = 40 | D5 = 45 | D6 = 40 | D7 = 35 |

PID control parameters can be calculated with the following formula in accordance with the basic values of PID parameters.

$$PID(k)=Kp[e(k)-e(k-1)]+Kie(k)+Kd(e(k)\_2e(k-1)+(k-2)),$$

wherein, k is the k time of sampling cycle, Kp is a proportional component, e(K) is the discrepancy value of the k time of sampling cycle, Ki=KpT/Ti, Kd=KpTd/T, T is a sampling cycle, Ti is an integrating time, Td is a derivative time.

Adjusting control parameters $OP_1$ can be obtained in accordance with the PID control parameters.

S107. It controls a valve for regulating coal gas flow and a valve for regulating air flow by combining the adjusting control parameters $OP_1$ with the first multiple feed forward components $FF_V$ and the second multiple feed forward components $FF_T$ as a final control output value.

Figure 2:
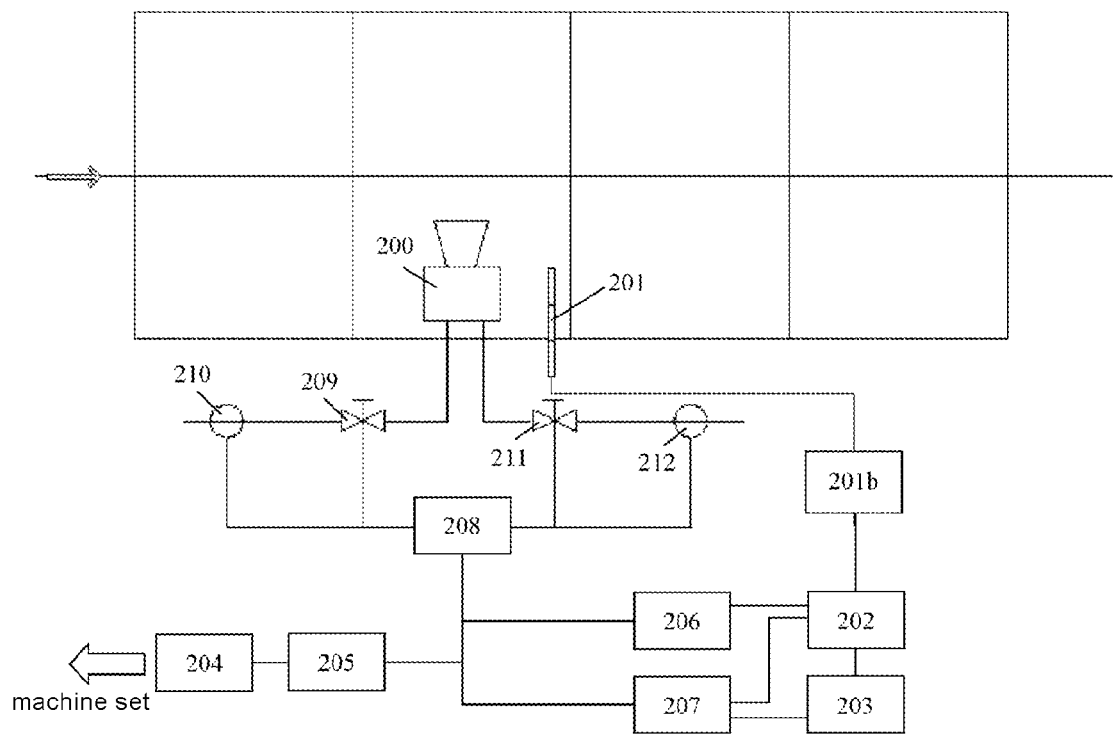
FIG. 2 is a structural view illustrating an apparatus for controlling furnace temperature of a fired heating furnace in accordance with the present invention.

With reference to FIG. 2, the present invention still discloses a furnace temperature control device of a fired heater, including a thermocouple 201, a module 202 for calculating a furnace temperature difference, a module 203 for calculating a gradient of furnace temperature change, a speed adjuster 204 of a fired heater machine set, a first multiple feed forward module 205, a second multiple feed forward module 206, a module 207 for creating an adjusting control parameter, a flow controller 208, a valve 209 for regulating coal gas flow, coal gas flow detector 210, a valve 211 for regulating air flow, and an air flow detector 212.

The thermocouple 201 is disposed adjacent to a burner 200, and is used for monitoring furnace temperatures. The thermocouple 201 has an analog-to-digital converting module 201b to output furnace temperature feedback values.

The module 202 for calculating a furnace temperature difference is connected to the analog-to-digital converting module 201b of the thermocouple 201. The module 202 for calculating a furnace temperature difference has saved furnace temperature setting values. The module 202 for calculating a furnace temperature difference calculates the differences between the furnace temperature setting values and the furnace temperature feedback values based on the furnace temperature setting values and the furnace temperature feedback values, and set these differences as discrepancy values $DV_1$. In one embodiment, the discrepancy values $DV_1$ between the furnace temperature setting values and the furnace temperature feedback values are set into a fuzzy control subset, the fuzzy control subset E={NB, NM, NS, ZE, PS, PM, PB}={Negative (Big), Negative (Medium), Negative (Small), Zero, Positive (Small), Positive (Medium), Positive (Big)}={−18, −12, −6, 0, 6, 12, 18}. That is, in accordance with the comparison between the discrepancy values $DV_1$ and subset {−18, −12, −6, 0, 6, 12, 18}, the discrepancy values $DV_1$ are classified into the subset {Negative (Big), Negative (Medium), Negative (Small), Zero, Positive (Small), Positive (Medium), Positive (Big)}, and represented by {NB, NM, NS, ZE, PS, PM, PB}.

The module 203 for calculating a gradient of furnace temperature change is connected to the module 202 for calculating a furnace temperature difference. The module for calculating a gradient of furnace temperature change 203 calculates and sets the differences between the furnace temperature setting values and the furnace temperature feedback values in a unit time, i.e., the gradients of furnace temperature change values, as discrepancy values $DV_2$. In one embodiment, the gradients of the furnace temperature change value, which are the discrepancy values $DV_2$, are set into a fuzzy control subset, the fuzzy control subset EC={NM, NS, ZE, PS, PM}={Negative (Medium), Negative (Small), Zero, Positive (Small), Positive (Medium)}={−1.5, −1, 0, 1, 1.5}. That is, in accordance with the comparison between the discrepancy values $DV_2$ and subset {−1.5, −1, 0, 1, 1.5}, the discrepancy values $DV_2$ are classified into the subset {Negative (Medium), Negative (Small), Zero, Positive (Small), Positive (Medium)}, and represented by {NM, NS, ZE, PS, PM}.

The speed adjuster 204 of the fired heater machine set is used for obtaining a speed V of the fired heater machine set.

The first multiple feed forward module 205, connected to the speed adjuster 204, obtains the first multiple feed forward output components $FF_V$ in accordance with the speed V of the fired heater machine set. In one embodiment, the first multiple feed forward module 205 obtains the first multiple feed forward output components $FF_V$ in accordance with the speed V of fired heater machine set V, based on the following Table 1.

TABLE 1

| V | | | | | | | |
|---|---|---|---|---|---|---|---|
| | 100 | 110 | 120 | 130 | 140 | 150 | 160 |
| $FF_V$ | $FF_{V1}$ | $FF_{V2}$ | $FF_{V3}$ | $FF_{V4}$ | $FF_{V5}$ | $FF_{V6}$ | $FF_{V7}$ |

That is, the different scope of the speeds V of the fired heater machine set corresponds to different first multiple feed back output components $FF_V$. $FF_{V1}$ to $FF_{V7}$ are a set of setting parameters. In one embodiment, values of $FF_V$ are set as: $FF_{V1}$=2, $FF_{V2}$=3.5, $FF_{V3}$=5, $FF_{V4}$=6.5, $FF_{V5}$=8, $FF_{V6}$=10, $FF_{V7}$=12.

The second multiple feed forward module 206, connected to the module 202 for calculating a furnace temperature difference, obtains the second multiple feed forward output components $FF_T$ in accordance with the differences between the furnace temperature setting values and the furnace temperature feedback values, i.e., the discrepancy values $DV_1$. In one embodiment, the second multiple feed forward module 206 obtains the second multiple feed forward output components $FF_V$ in accordance with the differences $DV_1$ between the furnace temperature setting values and the furnace temperature feedback values, based on the following Table 2.

TABLE 2

| $DV_1$ | | | | | | | |
|---|---|---|---|---|---|---|---|
| | −18 | −12 | −6 | 0 | 6 | 12 | 18 |
| $FF_T$ | $FF_{T1}$ | $FF_{T2}$ | $FF_{T3}$ | $FF_{T4}$ | $FF_{T5}$ | $FF_{T6}$ | $FF_{T7}$ |

That is, the different scope of the differences $DV_1$ between the furnace temperature setting values and the furnace temperature feedback values corresponds to different second multiple feed back output components $FF_T$. $FF_{T1}$ to $FF_{T7}$ are a set of setting parameters. In one embodiment, values of $FF_T$ are set as: $FF_{T1}$=6, $FF_{T2}$=3, $FF_{T3}$=1.5, $FF_{T4}$=0.2, $FF_{T5}$=−1.6, $FF_{T6}$=−3.5, $FF_{T7}$=−6.

The module 207 for creating an adjusting control parameter, connected to the module 202 for calculating a furnace temperature difference and the module 203 for calculating a gradient of furnace temperature change, looks upa PID control parameter in accordance with the discrepancy values $DV_1$ and $DV_2$, based on the fuzzy control rule, and creates the adjusting control parameters $OP_1$ in accordance with PID control parameters. In one embodiment, the fuzzy control rule is as follows.

The results of the fuzzy rule are obtained in accordance with the subsets of $DV_1$ and $DV_2$, based on the following Table 3.

TABLE 3

| | | E | | | | | | |
|---|---|---|---|---|---|---|---|---|
| | | NB | NM | NS | ZE | PS | PM | PB |
| EC | NM | PB | PB | PM | PM | PS | PS | PS |
| | NS | PB | PM | PM | PS | PS | PS | PS |
| | ZE | PM | PM | PS | PS | PS | PS | PS |
| | PS | PS | PS | PS | NS | NM | NM | NM |
| | PM | PM | PS | NS | NM | NB | NB | NB |

The results of the fuzzy rule comprise NB, NM, NS, ZE, PS, PM, PB, and basic values of PID parameters are obtained in accordance with the results of the fuzzy rule, based on the following Table 4.

TABLE 4

| | Results of Fuzzy Rule | | | | | | |
|---|---|---|---|---|---|---|---|
| | NB | NM | NS | ZE | PS | PM | PB |
| P | P1 | P2 | P3 | P4 | P5 | P6 | P7 |
| I | I1 | I2 | I3 | I4 | I5 | I6 | I7 |
| D | D1 | D2 | D3 | D4 | D5 | D6 | D7 |

Each result of the fuzzy rule corresponds to a set of values of parameters P, I and D, i.e., basic values of parameters, wherein P1 to P7, I1 to I7 and D1 to D7 are all predetermined basic values of parameters. In one embodiment, the basic values of PID parameters are set as follows.

| P | P1 = 40 | P2 = 50 | P3 = 55 | P4 = 60 | P5 = 55 | P6 = 45 | P7 = 40 |
|---|---|---|---|---|---|---|---|
| I | I1 = 50 | I2 = 55 | I3 = 60 | I4 = 90 | I5 = 65 | I6 = 50 | I7 = 45 |
| D | D1 = 30 | D2 = 40 | D3 = 40 | D4 = 40 | D5 = 45 | D6 = 40 | D7 = 35 |

PID control parameters can be calculated with the following formula in accordance with the basic values of PID parameters.

$$PID(k)=Kp[e(k)-e(k-1)]+Kie(k)+Kd(e(k)\_2e(k-1)+(k-2)),$$

wherein, k is the k time of sampling cycle, Kp is the proportional component, e(K) is the discrepancy value of the k time of sampling cycle, Ki=KpT/Ti, Kd=KpTd/T, T is the sampling cycle, Ti is the integrating time, Td is the derivative time.

The module 207 for creating an adjusting control parameter gets the adjusting control parameter $OP_1$ in accordance with the PID control parameter.

The flow controller 208, connected to the module 207 for creating an adjusting control parameter, the first multiple feed forward module 205 and the second multiple feed forward module 206, creates the final control output value by combining the adjusting control parameter $OP_1$ with the first multiple feed forward components $FF_V$ and the second multiple feed forward components $FF_T$.

The valve 209 for regulating coal gas flow, connected to the flow controller 208, regulates the coal gas flow in accordance with the final control output value.

The coal gas flow detector 210, connected to the flow controller 208, detects the current coal gas flow and feed it back.

The valve 211 for regulating air flow, connected to the flow controller 208, regulates the air flow in accordance with the final control output value.

The air flow detector 212, connected to the flow controller 208, detects the current air flow and feed it back.

Figure 3:
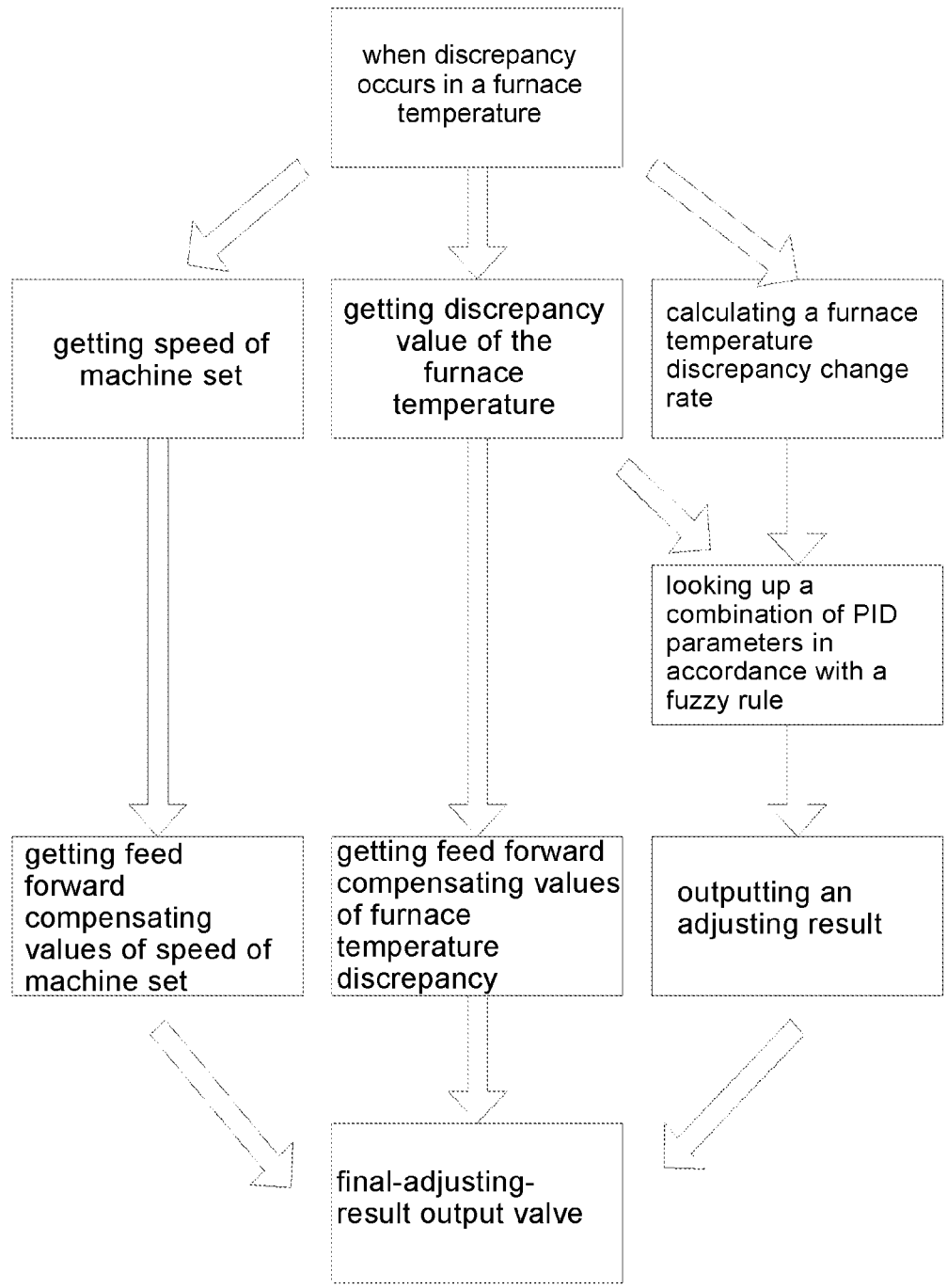
FIG. 3 shows the basic control logic of the method for controlling furnace temperature of a fired heating furnace in accordance with the present invention.

The basic logic of the method for controlling furnace temperature of a fired heating furnace according to the present invention can get the value of discrepancy of furnace temperature and the trend of furnace temperature's change in accordance with the furnace temperature change values and furnace temperature change rates. By means of the fuzzy control rule, based on the facts that the fuzzy control is good at steady-state control and the multiple feed forward control is good at unsteady-state control, different multiple feed forward compensating values and fuzzy control rules as well as different combinations of PID parameters will be used under different circumstances. Thus, it responds quickly, adjusts rapidly and shortens transition time in large discrepancy, and slows down the adjusting trend, decreases overshooting and makes the furnace temperature stable quickly in small discrepancy, so that the precision of furnace temperature will be improved. FIG. 3 shows the basic control logic of the method for controlling furnace temperature of a fired heating furnace in accordance with the present invention.

The basic concept of the method for controlling furnace temperature of a fired heating furnace and the control device in accordance with the present invention is that: it can get the value of discrepancy of furnace temperature and the trend of furnace temperature's change in accordance with the furnace temperature change values and furnace temperature change rates. By designing the fuzzy control algorithm and fuzzy control rule, with the characteristics that the fuzzy control is good at steady-state control and feed forward control is good at unsteady-state control, different multiple feed forward compensating values and fuzzy control rules as well as different combinations of PID parameters will be used under different circumstances. Thus, it responds quickly, adjusts rapidly and shortens the transition time in large discrepancy, and slows down the adjusting trend, decreases the overshooting and makes the furnace temperature stable quickly in small discrepancy, so that the precision of furnace temperature will be improved.

The invention claimed is:

1. A method for controlling furnace temperature of a fired heating furnace, characterized in that, comprising:
    measuring furnace temperatures to obtain furnace temperature feedback values;
    calculating the differences between furnace temperature setting values and the furnace temperature feedback values, as discrepancy values $DV_1$, in accordance with the furnace temperature feedback values and the furnace temperature setting values;
    calculating the differences between the furnace temperature setting values and the furnace temperature feedback values in a unit time, which is a gradient of furnace temperature change values, as discrepancy values $DV_2$;
    obtaining a speed V of a fired heater machine set from a speed adjuster of the fired heater machine set, and obtaining a first multiple feed forward output components $FF_V$ in accordance with the speed V of the fired heater machine set;
    obtaining a second multiple feed forward output components $FF_T$ in accordance with the differences between the furnace temperature setting values and the furnace temperature feedback values, which is the discrepancy values $DV_1$;
    looking up a PID control parameter in accordance with the discrepancy values $DV_1$ and $DV_2$, based on a fuzzy control rule, and creating an adjusting control parameter $OP_1$ in accordance with the PID control parameter;
    controlling a valve for regulating coal gas flow and a valve for regulating air flow by combining the adjusting control parameter $OP_1$ with the first multiple feed forward components $FF_V$ and the second multiple feed forward components $FF_T$ as a final control output value.

2. The method for controlling furnace temperature of a fired heating furnace as claimed in claim 1, wherein said fuzzy control rule includes:
    a fuzzy control subset of the discrepancy values $DV_1$ which is set as: E={NB, NM, NS, ZE, PS, PM, PB}={Negative (Big), Negative (Medium), Negative (Small), Zero, Positive (Small), Positive (Medium), Positive (Big)}={−18, −12, −6, 0, 6, 12, 18};
    a fuzzy control subset of the discrepancy values $DV_2$ which is set as EC={NM, NS, ZE, PS, PM}={Negative (Medium), Negative (Small), Zero, Positive (Small), Positive (Medium)}={−1.5, −1, 0, 1, 1.5}.

3. The method for controlling furnace temperature of a fired heating furnace as claimed in claim 2, wherein said fuzzy control rule further includes:
    obtaining the results of the fuzzy rule in accordance with subsets of $DV_1$ and $DV_2$, based on the following table:

|    |    | E  |    |    |    |    |    |    |
|----|----|----|----|----|----|----|----|----|
|    |    | NB | NM | NS | ZE | PS | PM | PB |
| EC | NM | PB | PB | PM | PM | PS | PS | PS |
|    | NS | PB | PM | PM | PS | PS | PS | PS |
|    | ZE | PM | PM | PS | PS | PS | PS | PS |
|    | PS | PS | PS | PS | NS | NM | NM | NM |
|    | PM | PM | PS | NS | NM | NB | NB | NB | obtaining the basic values of PID parameters in accordance with the results of the fuzzy rule, based on the following table:

| Results of Fuzzy Rule |    |    |    |    |    |    |    |
|---|----|----|----|----|----|----|----|
|   | NB | NM | NS | ZE | PS | PM | PB |
| P | P1 | P2 | P3 | P4 | P5 | P6 | P7 |
| I | I1 | I2 | I3 | I4 | I5 | I6 | I7 |
| D | D1 | D2 | D3 | D4 | D5 | D6 | D7 | wherein, the basic values of PID parameters are set as follows:

| P | P1 = 40 | P2 = 50 | P3 = 55 | P4 = 60 | P5 = 55 | P6 = 45 | P7 = 40 |
|---|---------|---------|---------|---------|---------|---------|---------|
| I | I1 = 50 | I2 = 55 | I3 = 60 | I4 = 90 | I5 = 65 | I6 = 50 | I7 = 45 |
| D | D1 = 30 | D2 = 40 | D3 = 40 | D4 = 40 | D5 = 45 | D6 = 40 | D7 = 35 | calculating a PID control parameter in accordance with the basic values of PID parameters $$PID(k)=Kp[e(k)-e(k-1)]+Kie(k)+Kd(e(k)\_2e(k-1)+(k-2)),$$

wherein, k is the k time of sampling cycle, Kp is a proportional component, e(K) is the discrepancy values of the k time of sampling cycle, Ki=KpT/Ti, Kd=KpTd/T, T is a sampling cycle, Ti is an integrating time, Td is a derivative time.

4. The method for controlling furnace temperature of a fired heating furnace as claimed in claim 1, wherein obtaining the first multiple feed forward output components $FF_V$ in accordance with the speed V of the fired heater machine set (V) includes:

obtaining the first multiple feed forward output components $FF_V$ in accordance with the speed V of the fired heater machine set, based on the following table:

| | V | | | | | | |
|---|---|---|---|---|---|---|---|
| | 100 | 110 | 120 | 130 | 140 | 150 | 160 |
| $FF_V$ | $FF_{V1}$ | $FF_{V2}$ | $FF_{V3}$ | $FF_{V4}$ | $FF_{V5}$ | $FF_{V6}$ | $FF_{V7}$ | wherein the values of $FF_V$ are set as: $FF_{V1}=2$; $FF_{V2}=3.5$; $FF_{V3}=5$; $FF_{V4}=6.5$; $FF_{V5}=8$; $FF_{V6}=10$; $FF_{V7}=12$.

5. The method for controlling furnace temperature of a fired heating furnace as claimed in claim 1, wherein obtaining the second multiple feed forward output components $FF_T$ in accordance with the differences between the furnace temperature setting values and the furnace temperature feedback value, which is the discrepancy values ($DV_1$), includes:

obtaining the second multiple feed forward output components $FF_T$ in accordance with the differences between the furnace temperature setting values and the furnace temperature feedback values $DV_2$, based on the following table:

| | $DV_1$ | | | | | | |
|---|---|---|---|---|---|---|---|
| | −18 | −12 | −6 | 0 | 6 | 12 | 18 |
| $FF_T$ | $FF_{T1}$ | $FF_{T2}$ | $FF_{T3}$ | $FF_{T4}$ | $FF_{T5}$ | $FF_{T6}$ | $FF_{T7}$ | wherein the values of $FF_T$ are set as: $FF_{T1}=6$, $FF_{T2}=3$, $FF_{T3}=1.5$, $FF_{T4}=0.2$, $FF_{T5}=-1.6$, $FF_{T6}=-3.5$, $FF_{T7}=-6$.

6. A device for controlling furnace temperature of a fired heating furnace, characterized in that, comprising:

a thermocouple disposed adjacent to a burner, and is used for monitoring furnace temperatures, the thermocouple having an analog-to-digital converting module to output furnace temperature feedback values;

a module for calculating a furnace temperature difference which is connected to the analog-to-digital converting module of the thermocouple, the module for calculating the furnace temperature difference saving furnace temperature setting values, and the module for calculating the furnace temperature difference calculating the differences between furnace temperature setting values and furnace temperature feedback values and set these differences as discrepancy values $DV_1$;

a module for calculating a gradient of furnace temperature change which is connected to the module for calculating the furnace temperature difference, it calculating and setting the differences between the furnace temperature setting values and the furnace temperature feedback values in a unit time, which is the gradients of furnace temperature change values, as discrepancy values $DV_2$;

a speed adjuster of a fired heater machine set being used for obtaining a speed V of the fired heater machine set;

a first multiple feed forward module, connected to the speed adjuster, obtaining a first multiple feed forward output components $FF_V$ in accordance with the speed of the fired heater machine set;

a second multiple feed forward module, connected to the module for calculating the furnace temperature difference, obtaining a second multiple feed forward output components $FF_T$ in accordance with the differences between the furnace temperature setting values and the furnace temperature feedback values, which is the discrepancy values $DV_1$;

a module for creating an adjusting control parameter, which is connected to the module for calculating the furnace temperature difference and the module for calculating the gradient of furnace temperature change, looking up a PID control parameter in accordance with the discrepancy values $DV_1$ and $DV_2$, based on the fuzzy control rule, and creating an adjusting control parameter $OP_1$ in accordance with the PID control parameter;

a flow controller, connected to the module for creating an adjusting control parameter, the first multiple feed forward module and the second multiple feed forward module, creating a final control output value by combining the adjusting control parameter $OP_1$ with the first multiple feed forward components $FF_V$ and the second multiple feed forward components $FF_T$;

a valve for regulating coal gas flow, connected to the flow controller, regulating the coal gas flow in accordance with the final control output value;

a coal gas flow detector, connected to the flow controller, detecting the current coal gas flow and feed it back;

a valve for regulating air flow, connected to the flow controller, regulating the air flow in accordance with the final control output value; and an air flow detector, connected to the flow controller, detecting the current air flow and feed it back.

7. The device for controlling furnace temperature of a fired heating furnace as claim in claim 6, wherein said fuzzy control rule includes:

a fuzzy control subset of the discrepancy values $DV_1$ which is set as: E={NB, NM, NS, ZE, PS, PM, PB}={Negative (Big), Negative (Medium), Negative (Small), Zero, Positive (Small), Positive (Medium), Positive (Big)}={−18, −12, −6, 0, 6, 12, 18};

a fuzzy control subset of the discrepancy values $DV_2$ which is set as: EC={NM, NS, ZE, PS, PM}={Negative (Medium), Negative (Small), Zero, Positive (Small), Positive (Medium)}={−1.5, −1, 0, 1, 1.5}.

8. The device for controlling furnace temperature of a fired heating furnace as claimed in claim 7, wherein said fuzzy control rule further includes:

obtaining the results of the fuzzy rule in accordance with subsets of $DV_1$ and $DV_2$, based on the following table:

| | | E | | | | | | |
|---|---|---|---|---|---|---|---|---|
| | | NB | NM | NS | ZE | PS | PM | PB |
| EC | NM | PB | PB | PM | PM | PS | PS | PS |
| | NS | PB | PM | PM | PS | PS | PS | PS |
| | ZE | PM | PM | PS | PS | PS | PS | PS |
| | PS | PS | PS | PS | NS | NM | NM | NM |
| | PM | PM | PS | NS | NM | NB | NB | NB | obtaining the basic values of PID parameters in accordance with the results of the fuzzy rule, based on the following table:

| Results of Fuzzy Rule | | | | | | | |
|---|---|---|---|---|---|---|---|
| | NB | NM | NS | ZE | PS | PM | PB |
| P | P1 | P2 | P3 | P4 | P5 | P6 | P7 |
| I | I1 | I2 | I3 | I4 | I5 | I6 | I7 |
| D | D1 | D2 | D3 | D4 | D5 | D6 | D7 | wherein, the basic values of PID parameters are set as follows:

| P | P1 = 40 | P2 = 50 | P3 = 55 | P4 = 60 | P5 = 55 | P6 = 45 | P7 = 40 |
|---|---|---|---|---|---|---|---|
| I | I1 = 50 | I2 = 55 | I3 = 60 | I4 = 90 | I5 = 65 | I6 = 50 | I7 = 45 |
| D | D1 = 30 | D2 = 40 | D3 = 40 | D4 = 40 | D5 = 45 | D6 = 40 | D7 = 35 | calculating a PID control parameter in accordance with the basic values of PID parameters $$PID(k)=Kp[e(k)-e(k-1)]+Kie(k)+Kd(e(k)\_2e(k-1)+(k-2)),$$

wherein, k is the k time of sampling cycle, Kp is a proportional component, e(K) is the discrepancy value of the k time of sampling cycle, Ki=KpT/Ti, Kd=KpTd/T, T is a sampling cycle, Ti is an integrating time, Td is a derivative time.

9. The device for controlling furnace temperature of a fired heating furnace as claimed in claim 6, wherein the first multiple feed forward module obtains the first multiple feed forward output components $FF_V$ in accordance with the speed V of fired heater machine set, based on the following table:

| V | | | | | | | |
|---|---|---|---|---|---|---|---|
| | 100 | 110 | 120 | 130 | 140 | 150 | 160 |
| $FF_V$ | $FF_{V1}$ | $FF_{V2}$ | $FF_{V3}$ | $FF_{V4}$ | $FF_{V5}$ | $FF_{V6}$ | $FF_{V7}$ | wherein the values of $FF_V$ are set as: $FF_{V1}=2$; $FF_{V2}=3.5$; $FF_{V3}=5$; $FF_{V4}=6.5$; $FF_{V5}=8$; $FF_{V6}=10$; $FF_{V7}=12$.

10. The device for controlling furnace temperature of a fired heating furnace as claimed in claim 6, wherein the second multiple feed forward module obtains the second multiple feed forward output components $FF_T$ in accordance with the differences $DV_1$ between the furnace temperature setting values and the furnace temperature feed forward values, based on the following table:

| $DV_1$ | | | | | | | |
|---|---|---|---|---|---|---|---|
| | -18 | -12 | -6 | 0 | 6 | 12 | 18 |
| $FF_T$ | $FF_{T1}$ | $FF_{T2}$ | $FF_{T3}$ | $FF_{T4}$ | $FF_{T5}$ | $FF_{T6}$ | $FF_{T7}$ | wherein the values of ($FF_T$) are set as: $FF_{T1}=6$, $FF_{T2}=3$, $FF_{T3}=1.5$, $FF_{T4}=0.2$, $FF_{T5}=-1.6$, $FF_{T6}=-3.5$, $FF_{T7}=-6$.

* * * * *